(No Model.)
J. A. FAIRBANKS.
Hose Patch.
No. 238,770. Patented March 15, 1881.
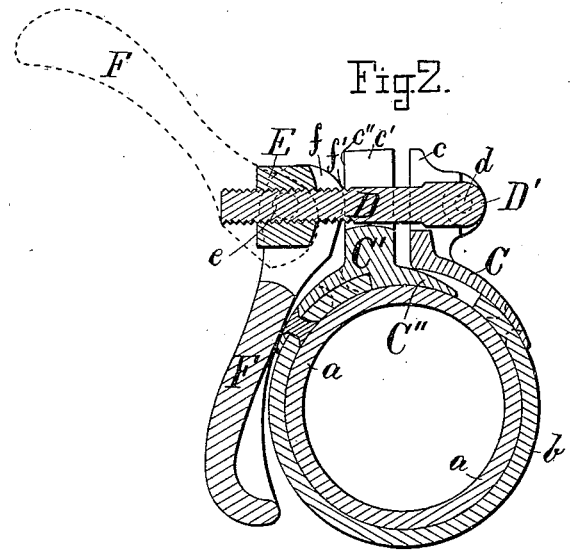
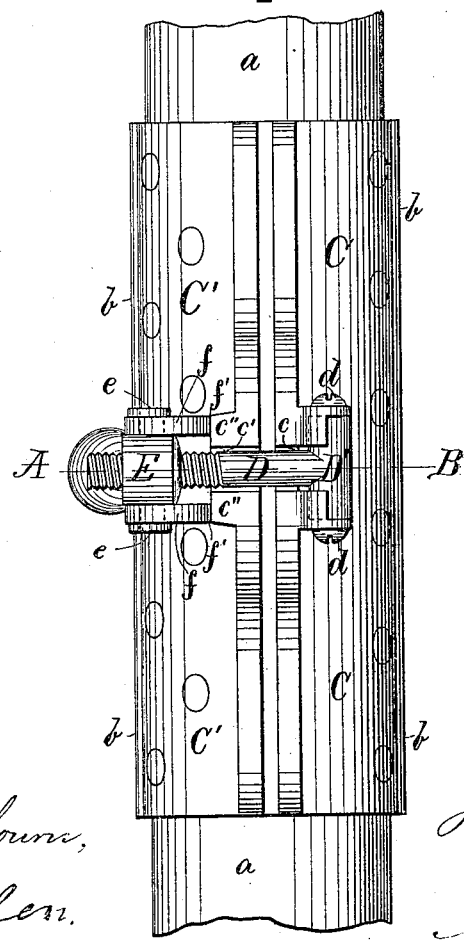
Witnesses:
Henry Chadbourn,
F. Allen.
Inventor:
John A. Fairbanks,
by Alban Andrew,
his atty.

UNITED STATES PATENT OFFICE.

JOHN A. FAIRBANKS, OF CAMBRIDGEPORT, MASSACHUSETTS.

HOSE-PATCH.

SPECIFICATION forming part of Letters Patent No. 238,770, dated March 15, 1881.

Application filed July 24, 1880. (No model.)

*To all whom it may concern:*

Be it known that I, JOHN A. FAIRBANKS, a citizen of the United States, residing at Cambridgeport, in the county of Middlesex and State of Massachusetts, have invented certain new and useful Improvements in Hose-Patches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in hose-patches for the purpose of covering ruptures in hose-pipes, and thereby stopping leaks in a very quick manner that may occur by the accidental bursting of the hose during action; and this invention consists of a detachable and adjustable clamping device for closing the patch firmly over the ruptured place on the hose in a manner as will hereinafter be more fully shown and described, reference being had to the accompanying drawings, on which—

Figure 1 represents a plan view, and Fig. 2 represents a cross-section on the line A B shown in Fig. 1.

Similar letters refer to similar parts wherever they occur on the different parts of the drawings.

$a$ represents the hose to be patched, and $b$ represents the flexible patch-piece, composed of leather, rubber, or other suitable flexible material, to each edge of which is secured a metal flange, C C', as shown. The projecting ends of the flanges C C' are provided with slotted openings or recesses $c$ $c'$, into which the shank of the fastening-bolt D is laid, as shown. The said fastening-bolt D is provided in one end with a T-head, D', that is hinged to the slotted flange C by means of screws or pins $d$ $d$, as shown in the drawings. The outer end of the fastening-bolt D is screw-threaded, and provided with a nut, E, that is jointed at $e$ $e$ to the forked cam-lever F, having cams $ff$ and locking-projections $f'$ $f'$, arranged to act against the projections $c''$ $c''$ on each side of the slotted opening $c'$ when the cam-lever F is moved into its locking position, as shown in full lines in Fig. 2. The flange C' is provided with an inner and arched lip, C'', that projects beneath the flange C, as shown, by which arrangement a complete circular shield or patch is produced, surrounding the injured hose, and thus preventing leakage at the space between the flanges C C'.

To use my invention the patch $b$ is closed around the injured part of the hose $a$, as shown in the drawings, and the bolt D swung into position and laid within the notches or recesses $c$ $c'$ on the flanges C C', after which the nut E is screwed on the bolt D as far as may be required, according to the size of the hose that is to be patched. The cam-lever F is then turned downward around the fulcra $e$ $e$, to the position shown in full lines in Fig. 2, thereby causing the cams $ff$ to impinge against the projections $c''$ $c''$ on the flange C, and in this manner to effectually compress the hose-patch $b$ around the broken hose, for the purpose set forth.

It will be seen that by operating the cam-lever F in a lateral direction to the axis of the hose-pipe to be patched, and by closing it up against the side of the patch, as shown, very slight obstruction is made by the patch when the hose is dragged on the ground, as compared with other hose-patches now in use.

To disconnect the patch from the hose it is only necessary to swing the cam-lever F to the position as shown in dotted lines in Fig. 2, when the bolt D is made free to swing on its fulcrum out of the recesses $c$ $c$ on the clamps.

One or more fastening-bolts and cam-levers, constructed as described, may be used, according to the length of the patch, without departing from the spirit of my invention.

To more effectually prevent leakage a molded and split rubber sleeve may be placed around the broken or injured hose and the patch closed around the said rubber sleeve.

I am aware that a flexible patch-piece provided with metal flanges has heretofore been used, combined with various clamping devices, and therefore I do not claim as my invention the flexible patch-piece $b$ and flanges C C'; but What I wish to secure by Letters Patent and claim is—

The combination, with a fleixble hose-patch, $b$, of the two metal flanges C and C' C'', formed with the recesses $c$ $c'$, the hinged screw-threaded bolt D, the nut E, arranged upon the bolt, and the cam-lever F, jointed at its forked end to the nut, and formed with the cams $f$ and locking projections $f'$, adapted to act against projections at the sides of the slot or recess $c'$, substantially as described.

In testimony whereof I have affixed my signature in presence of two witnesses.

JOHN A. FAIRBANKS.

Witnesses:
ALBAN ANDRÉN,
HENRY CHADBOURN.